(No Model.)

J. S. ZERBE.
HAND FIRE EXTINGUISHER.

No. 320,425. Patented June 16, 1885.

WITNESSES:
John J. Geoghan
O. J. Bailey

INVENTOR
J. S. Zerbe

UNITED STATES PATENT OFFICE.

JAMES S. ZERBE, OF HARTWELL, OHIO.

HAND FIRE-EXTINGUISHER.

SPECIFICATION forming part of Letters Patent No. 320,425, dated June 16, 1885.

Application filed January 28, 1885. (No model.)

*To all whom it may concern:*

Be it known that I, JAMES S. ZERBE, of Hartwell, in the county of Hamilton and State of Ohio, have invented a new and useful Improvement in Hand Fire-Extinguishers, which improvement is fully set forth in the following specification and accompanying drawings, in which—

Figure 1:
Figure 2:
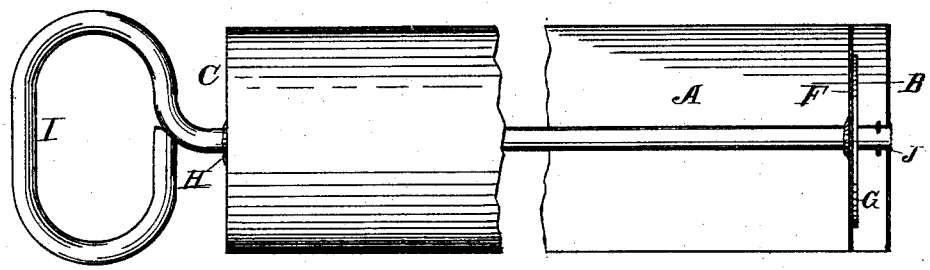
Figure 3:
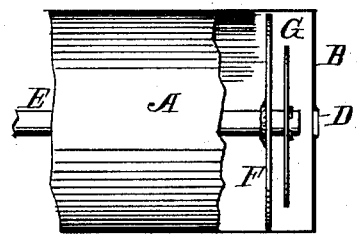

Figure 1 is a perspective view of a complete hand fire-extinguisher. Fig. 2 is a sectional view of the same enlarged; and Fig. 3 is a view of the ejecting end, showing the plunger withdrawn from the head.

The object of my invention is to construct a hand fire-extinguisher, by means of which the liquid within the tube can be readily ejected when desired, in case of fire.

The particular feature of this invention consists in employing a tube or cylinder having a plunger or piston-rod bearing a piston and a loose disk, which rod passes entirely through both heads of the tube or cylinder, said rod or handle being soldered to the heads, so as to hermetically seal the tube to prevent leakage, whereby when the rod is turned or wrenched the soldered parts will give way, producing an opening at one end for the ejection of the fluid, and at the same time permitting the plunger to be reciprocated, all of which will now be fully set forth in detail.

In the accompanying drawings, A represents a tube or cylinder of any suitable size having at the ends the plain heads B C. The head B, which is at the forward end of the tube, has centrally a perforation, D, adapted to receive tightly the forward end of the plunger or piston rod E, as shown in Figs. 1 and 2. The head C at the rear end of the tube has also centrally an opening, so as to readily admit the rod E. The piston-rod E has a disk or piston, F, secured to it near its forward end, having perforations or openings through it, and this disk is soldered or attached firmly to the rod. Sliding on the rod on the forward side of this disk is a smaller disk, G, which acts as a valve when the rod is moved backward or forward. The aperture D, through the forward end of the tube A, is closed by the forward end of the rod E and hermetically sealed by solder.

In operation the rod or plunger E is inserted with its disk F in the cylinder of tube A, so that the forward end of the rod projects through the head B in the aperture D, and the forward end of the rod E is soldered to the head B, as shown in Fig. 2, while the rod at the rear end is soldered to the head C, as shown at H. Either one or both of these ends may be soldered before the liquid is placed in the tube; but in any event after sealing the ends to the rod or plunger, the liquid is to be placed into the tubes by means of an independent aperture, or through one of the heads, if desired, and afterward hermetically sealed. In this condition the device is ready for transportation and for use when desired.

The instrument is used by turning the rod E and loosening the solder at the end of the tube A. This releases the said rod and allows it to be reciprocated in the tube for the purpose of injecting the fire extinguishing fluid. By this movement also it will be observed that the opening D is unsealed, and as the plunger is moved forward the liquid is forcibly expelled through the opening thus made. As it is frequently the case that the device will be placed or hung up in a room where fires are likely to occur, and as it is of the utmost importance that the liquid within should be freed, it is designed to hang the device upon a nail by means of loop or handle I.

If the device is to be suspended by the handle I, so that it will operate automatically by heat, the rod E should be soldered at the apertures through the ends of the tube A by a metal or compound which is fusible at a low temperature. Thus, when said solder melts, the tube A will descend and permit the liquid to flow from the aperture D.

Having described my invention, what I claim as new is—

1. A portable fire-extinguisher consisting of a tube, A, a piston-rod provided with a perforated piston and a loose disk or valve, a perforated head, B, adapted to receive the end of the piston-rod, and the latter held by means of solder applied substantially as described.

2. In a hand fire-extinguisher, the tube having at each end a plain head centrally perforated, provided with a plunger or piston rod within having at its outer end the handle I and on its inner end the head F and valve G, said rod resting in the apertures or openings of the heads, so that when said plunger or rod is soldered to the said heads the tube will be hermetically sealed, substantially as herein set forth.

3. In a hand fire-extinguisher, the piston rod or plunger within the tube having a suitable head and valve within, with the opposite ends of said rod resting and closing up the central orifice of the heads, and soldered to said heads by fusible solder, so that by a torsional movement of the plunger it is wrenched from the heads, the said plunger can be reciprocated within the tube, and the inner end of the rod being removed from the orifice of the forward end an opening will be formed sufficiently large to eject the contents of the fluid therefrom, substantially as herein set forth.

4. In a hand fire-extinguisher, the tube A, having the plain heads B C centrally perforated, in combination with the plunger or piston rod E within said tube and secured in the central orifices of said heads or ends by means of fusible solder or otherwise, said rod having a perforated head and valve, and on its outer end the handle, the whole arranged as and for the purpose substantially as herein set forth.

In testimony that I claim the foregoing I have hereunto set my hand this 26th day of January, 1885, in the presence of witnesses.

JAMES S. ZERBE.

Witnesses:
JOHN J. GEGHAN,
O. J. BAILEY.